United States Patent Office 3,655,761
Patented Apr. 11, 1972

3,655,761
CERTAIN OXIME ESTERS
Arnold D. Gutman, Berkeley, Calif., assignor to Stauffer
Chemical Company, New York, N.Y.
No Drawing. Continuation-in-part of application Ser. No.
649,024, June 26, 1967. This application Dec. 4, 1969,
Ser. No. 882,299
Int. Cl. C07c 131/00
U.S. Cl. 260—566 AE                                     4 Claims

ABSTRACT OF THE DISCLOSURE

Compounds having the formula

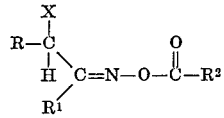

in which X is chlorine or bromine; R is hydrogen or alkyl having from 1 to 6 carbon atoms; $R^1$ is alkyl having 1 to 4 carbon atoms or haloalkyl having from 1 to 4 carbon atoms, phenyl or nuclear substituted derivatives thereof in which the substituents are halogen, nitro or lower alkyl; $R^2$ is alkenyl having from 2 to 4 carbon atoms. The compounds are useful in controlling weeds and for inhibiting the growth of bacteria and fungi.

---

This application is a continuation-in-part of application Ser. No. 649,024, filed June 26, 1967 now abandoned.

This invention relates to novel chemical compounds and to their use as hericides and in controlling fungi and bacteria. More particularly, the chemical compounds are certain keto oxime esters.

The compounds of the present invention are those having the formula

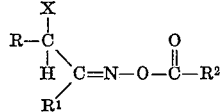

in which X is chlorine or bromine, preferably chlorine; R is hydrogen or alkyl having from 1 to 6 carbon atoms, preferably hydrogen; $R^1$ is alkyl having 1 to 4 carbon atoms, haloalkyl having from 1 to 4 carbon atoms, phenyl or nuclear substituted derivatives thereof in which the substituents are halogen, nitro or lower alkyl, preferably chloromethyl; $R^2$ is alkenyl having from 2 to 4 carbon atoms.

The compounds of the present invention are phytotoxic and are particularly useful as herbicides, especially in post-emergent control of weeds. The compounds are also useful in inhibiting the growth of bacteria and fungi and in inhibiting the growth of fungi upon cellulosic materials.

The compounds of the present invention can be prepared by reacting a compound of the formula

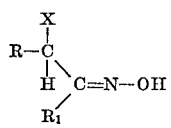

in which X, R and $R^1$ are as defined with a compound of the formula

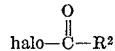

in which halo is chlorine or bromine and $R^2$ is as defined. Preferably, the reaction is carried out in the presence of a base such as pyridine and in a solvent for the reactants. Generally, the reaction is exothermic so no heating is required. Cooling is sometimes required to control the reaction rate. The compounds of this invention can be recovered from the mixture and purified by standard procedures.

Compounds of the formula

can be prepared by reacting

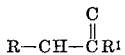

with excess hydroxylamine hydrochloride in ethanol and water, wherein X, R and $R^1$ are as defined. The reaction can be run with heating under reflux for several hours. The desired product is recovered and purified by conventional techniques.

Example 1.—1,3-dichloroacetoneoxime 63.5 grams (0.50 mole) 1,3-dichloropropanone, 69.5 grams (1.00 mole) hydroxylamine hydrochloride, 250 ml. ethanol and 25 ml. of water were combined and heated under reflux for four hours. The cooled mixture was poured into 500 ml. of water. The aqueous solution was extracted with three 100 ml. portions of chloroform. The chloroform phases were combined and dried with anhydrous $MgSO_4$. The chloroform was evaporated to give 66.3 g. (93.6% theory) of 1,3-dichloroacetoneoxime,

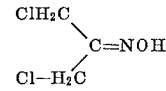

$n_D^{30} = 1.5044$.

Example 2.—1,3-dichloroacetoneoximecrotonate 10.0 grams (0.07 mole) 1,3-dichloroacetoneoxime, 7.2 grams (0.07 mole) crotonyl chloride were combined in 100 ml. of benzene. The mixture was stirred and cooled to 10° C. 6.3 grams (0.08 mole) of pyridine was added over a period of 15 minutes. The mixture was stirred at room temperature for 1 hour. An additional 100 ml. benzene was added and the mixture was washed with two 100 ml. portions of water. The benzene phase was dried with anhydrous $MgSO_4$ and evaporated to give 8.3 g. (55.8% of theory) of 1,3-dichloroacetoneoximinocrotonate

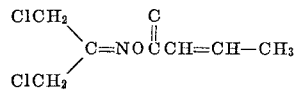

$n_D^{30} = 1.5090$.

The following is a table of certain selected compounds that have been prepared according to the procedure described hereto. Compound numbers have been assigned to each compound and are used throughout the remainder of the application.

TABLE I

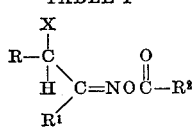

| Compound number | R | R¹ | R² | X |
|---|---|---|---|---|
| 1* | Hydrogen | Chloromethyl | 1-propenyl | Cl |
| 2 | do | do | Vinyl | Cl |
| 3 | do | do | Allyl | Cl |
| 4 | do | Methyl | 1-propenyl | Cl |
| 5 | n-Pentyl | do | do | Cl |
| 6 | Ethyl | Ethyl | do | Cl |
| 7 | n-Propyl | Methyl | do | Cl |
| 8 | Hydrogen | Phenyl | do | Cl |
| 9 | do | do | Vinyl | Cl |
| 10 | Methyl | Methyl | 1-propenyl | Cl |
| 11 | do | do | Vinyl | Cl |

*Prepared in Example 2.

The following tests illustrate utility of the compounds as herbicides and in controlling fungi and bacteria.

As previously mentioned, the herein described novel compositions produced in the above-described manner are phytotoxic compounds which are useful and valuable in controlling various plant species. The compounds of this invention were tested as herbicides in the following manner.

Pre-emeregnce herbicide test.—The seeds of crabgrass, foxtail, watergrass, red oats, pigweed, mustard and curled dock were planted in individual rows one-half inch deep in Santa Cruz sandy loam soil contained in compressed paper flats. Enough seeds were planted to give about thirty to fifty plants each of the weed species in each flat. The flats were watered after planting. The following day, each flat was sprayed at the rate of 20 pounds of the candidate compound under test in 80 gallons of solution per acre. An atomizer was used to spray the solution on the soil surface. Two weeks later, the degree of weed control was determined by comprising the amount of germination and growth of each weed in the treated flats with the weeds in several untreated control flats. The results of the pre-emergence herbicide test showed that compounds 1 through 3 and 8 and 9 are especially useful in controlling crabgrass, foxtail, water grass, red oats, pigweed, curled dock and mustard.

Post-emergence herbicide test.—The seeds of crabgrass, water grass, red oats, Indian mustard, curled dock and pinto bean were planted in individual rows in Santa Cruz sandy loam soil as described in the pre-emergence test. After growing for two weeks under greenhouse conditions, the plants were four to six inches tall. Thereafter, the candidate test compound was applied to the foliage by means of an overhead spray while the flat moved under the spray on a moving table. A concentration of 0.5% of active compound in the spray was used at a rate equivalent to approximately 20 pounds per acre. Two weeks after treatment, the injury results were recorded using a similar rating system as used in the pre-emergence test. Table II lists the results obtained therefrom.

TABLE II.—POST-EMERGENCE ACTIVITY RATE
[20 pounds per acre]

| Compound number | Crabgrass | Water grass | Red oats | Indian mustard | Curled dock | Pinto bean |
|---|---|---|---|---|---|---|
| 1 | ++ | − | + | +++ | +++ | +++ |
| 2 | ++ | + | − | +++ | +++ | +++ |
| 3 | | | | No data | | |
| 4 | +++ | + | + | +++ | +++ | +++ |
| 5 | ++ | − | − | +++ | + | +++ |
| 6 | +++ | +++ | ++ | +++ | +++ | ++ |
| 7 | +++ | + | + | +++ | +++ | + |
| 8 | + | − | + | +++ | +++ | +++ |
| 9 | +++ | − | + | +++ | +++ | +++ |
| 10 | +++ | + | + | +++ | ++ | ++ |
| 11 | +++ | − | + | +++ | ++ | ++ |

Note.—+++=severe injury or death. ++=moderate injury. +=slight injury. −=no injury.

The compounds of the present invention find particular utility as post-emergence herbicides and may be applied in a variety of ways at various concentrations. They may be combined with suitable carriers and applied as dusts, sprays or drenches. The amount applied will depend upon the nature of the weeds or plants to be controlled and the rate of application may vary from 1 to 80 pounds per acre. One particularly adavntageous way of applying the compounds is as a narrow band along a row crop, straddling the row.

In vitro vial test.—This test measures the bactericidal and fungicidal properties of a compound when in contact with a growing bacterium or fungus. The test is conducted by partially filling two 1-ounce vials with malt broth and one 1- ounce vial with nutrient broth. Next, the test compound is added to the vials at a certain concentration, expressed in parts per million, and mixed with the broth. A water suspension of spores of the desired fungi or cells of the desired bacteria (one organism per vial) is added. The vials are then sealed and incubated for one week; at this time the vials are examined and the results recorded. Table III shows the results of various compounds tested by the in vitro vial test.

TABLE III.—CONCENTRATION (P.P.M.) WHICH INHIBITED GROWTH

| | Fungus | | Bacteria | |
|---|---|---|---|---|
| Compound number | Aspergillus niger | Penicillium sp. | Escherichia coli | Staphylococcus Aureus |
| 1 | (0.25) | 0.5 | (50) | 10 |
| 2 | 0.25 | (0.25) | 25 | 10 |
| 3 | | No data | | |
| 4 | 1 | (1) | >50 | >50 |
| 5 | 10 | 25 | >50 | >50 |
| 6 | 25 | 25 | >50 | >50 |
| 7 | 10 | 25 | >50 | >50 |
| 8 | 10 | 10 | >50 | >50 |
| 9 | 10 | 10 | >50 | >50 |
| 10 | (1) | (5) | >50 | >50 |
| 11 | 5 | 5 | >50 | >50 |

As can be seen by the test results, the compounds of the present invention find particular utility as bactericides and fungicides. The compounds can be applied in a variety of ways at various concentrations. They can be combined with suitable carriers and applied as dusts, sprays or drenches. The amount applied will depend on the nature of the utility. The rate of application can also vary with the microbiological use intended.

I claim:
1. A compound having the formula

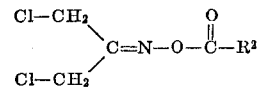

in which R² is alkenyl having 2 to 4 carbon atoms.
2. The compound of claim 1 in which R² is 1-propenyl.
3. The compound of claim 1 in which R² is vinyl.
4. The compound of claim 1 in which R² is allyl.

References Cited

FOREIGN PATENTS 825,709  10/1969  Canada _____ 260—566

BERNARD HELFIN, Primary Examiner

G. A. SCWARTZ, Assistant Examiner

U.S. Cl. X.R.

71—121; 260—566 A; 424—327